April 30, 1963 R. DALLY 3,088,000

PHONOGRAPH CARTRIDGE AND STYLUS

Filed Feb. 27, 1958 2 Sheets-Sheet 1

INVENTOR:
ROY DALLY,
BY Charles W. Helzer
HIS ATTORNEY.

April 30, 1963 R. DALLY 3,088,000
PHONOGRAPH CARTRIDGE AND STYLUS
Filed Feb. 27, 1958 2 Sheets-Sheet 2

INVENTOR:
ROY DALLY,
BY Charles W. Helzer
HIS ATTORNEY.

United States Patent Office 3,088,000

Patented Apr. 30, 1963

3,088,000

PHONOGRAPH CARTRIDGE AND STYLUS

Roy Dally, Skaneateles, N.Y., assignor to General Electric Company, a corporation of New York

Filed Feb. 27, 1958, Ser. No. 717,941
10 Claims. (Cl. 179—100.41)

The present invention relates to new and improved phonograph pickup cartridges of the variable magnetic reluctance type, and to replacement stylus assemblies therefor.

More particularly, the invention relates to new and improved magnetic phonograph pickup cartridges having a record engaging stylus secured in a flexible armature which is floatingly supported on the bottom of the cartridge by a block of damping material.

One of the most important characteristics of any phonograph pickup cartridge is the pressure which the record engaging stylus of the carriage exerts on a record groove for it has been established that record life is directly related to this characteristic of the phonograph pickup cartridge with which the record is used. Heretofore, efforts to minimize the tracking pressure of phono pickup cartridges have revolved about attempts at reduction of the total weight of the cartridge and tone arm. In the present invention it is proposed to reduce the tracking pressure of a phonograph pickup cartridge by a unique suspension for the record engaging stylus arm.

It is therefore one object of the present invention to provide a new and improved magnetic phonograph pickup having an extremely low tracking pressure in the neighborhood of two grams.

Another object of the invention is to provide a new and improved magnetic phonograph pickup having a record engaging stylus secured in a stylus supporting armature which in turn is secured to the bottom of the cartridge by a block of damping material.

In practicing the invention a phonograph pickup cartridge of a variable reluctance type is provided which includes a body member having a pair of downwardly depending core members supported therein with the core members having spaced-apart pole pieces. A pair of pickup coils surround each of the core members, and a permanent magnet is supported within the body member which is spaced from the core members. A replaceable stylus assembly is provided to this assemblage which includes a post adapted to be supported in the body member and having a first arm of nonmagnetic material secured to the post cantilever-fashion. Secured to this first arm is an armature of magnetic material which has a record engaging stylus secured to the end thereof. This armature is secured to the first arm by a block of damping material in a manner such that the record engaging stylus is disposed intermediate the pole pieces of the cartridges.

Other objects, features and attendent advantages of the invention will become more apparent after a more detail study of the following description taken in conjunction with the accompanying drawings, wherein.

Figure 1:
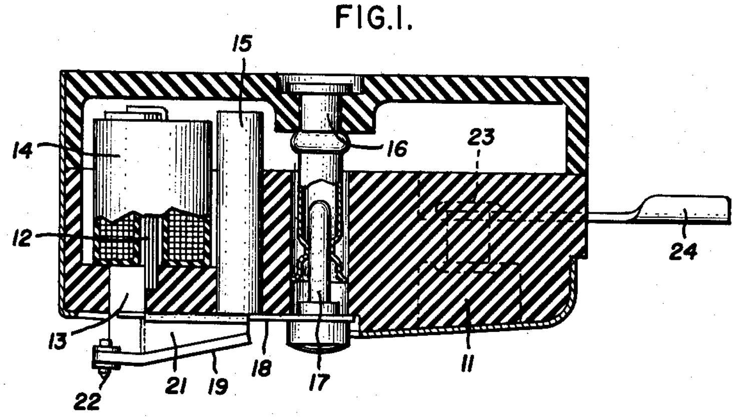
FIG. 1 is a sectional view of a magnetic phonograph pickup cartridge constructed in accordance with the invention.
Figure 2:
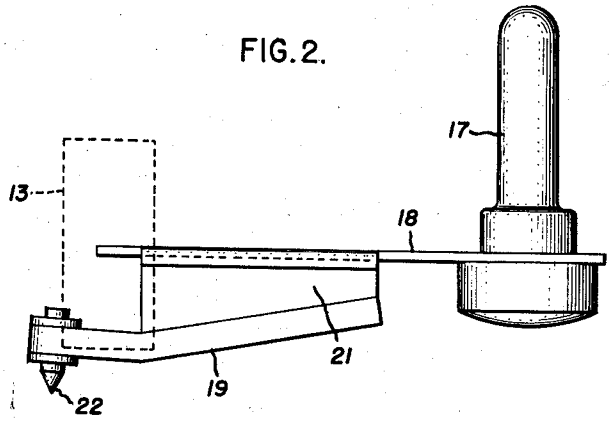
FIG. 2 is a side view of a replaceable stylus assembly used in the magnetic pickup cartridge shown in FIG. 1, and comprising a part of the invention.
Figure 3:
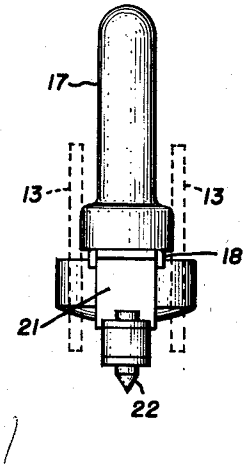
FIG. 3 is an end view of the replaceable stylus assembly shown in FIG. 2.
Figure 4:
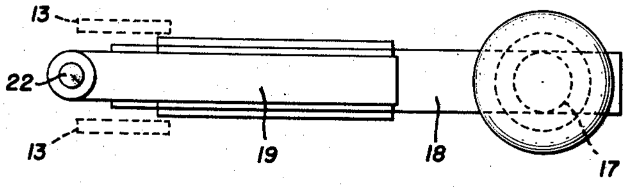
FIG. 4 is a plan view of the replaceable stylus assembly shown in FIG. 2.

A preferred embodiment of the invention is shown in FIGS. 1 through 4 of the drawings. In this particular embodiment of the invention a magnetic phonograph cartridge is illustrated which comprises a body member 11 having a generally box-shaped configuration, and formed of a suitable plastic such as an epoxy resin molded to provide desired openings for the remainder of the cartridge. The body member 11 includes openings supporting a pair of armature members, one of which is shown at 12, having attached thereto a pair of spaced-apart pole pieces 13 and which are formed of any suitable magnetic material preferably of a laminated nickel alloy steel. Also supported in the same opening in the body member 11 is a pair of electrical coils 14 which surround each of the core members 12. The pickup coils 14 are conventional helically wound coils formed from a number of turns of insulated conductor. Spaced from the coils 14 and core members 12 in a suitable opening in body member 11 is a permanent magnet 15 which preferably comprises a small alnico magnet shaped in the form of a cylindrical bar. In the top of body member 11 is a cylindrically-shaped receptacle 16 having an indented circumferential portion adapted to removably support a replaceable stylus assembly to be described more fully hereinafter.

The replaceable stylus assemby which is secured in the retaining receptacle 16 comprises a post 17 adapted to be removably and frictionally supported by the indented circumferential portion of receptacle 16. Secured to post 17 cantilever-fashion is a first arm 18 of non-magnetic material such as brass. Arm 18 extends towards the pole-pieces 13, and preferably is disposed intermediate the two pole pieces so as to serve as a centering device. An armature 19 of magnetic material is secured to the first arm 18 by means of a block of damping material 21. The block of damping material 21 may comprise any suitable resilient material but preferably is formed of butyl rubber, and preferably extends over a major portion of the length of the armature 19 although it need not extend over its entire length. These members may be secured together by any suitable adhesive capable of bonding rubber or similar resilient material to metal, but the armature 19 must be secured on the first arm of non-magnetic material 18 in a manner such that it extends between the spaced-apart pole pieces 13. Preferably, the armature 19 is secured to the first arm 18 in a manner such that the end thereof furtherest from the post 17 extends beyond the block of damping material 21 cantilever-fashion, and this free end has a record engaging stylus 22 of diamond or sapphire secured thereto. To complete construction of the cartridge, an electrical connection is provided between the pickup coils 14 to terminal post 23 and output terminals 24 to which the input of a preamplifier or amplifier of a loudspeaker system may be connected.

By the above-described construction, the record engaging stylus 22 is allowed to follow the undulations in the record grooves so that the armature 19 vibrates between the two pole pieces 13 as a simple rigid mass. By this is meant that there is none or substantially no twisting of the armature 19 but rather the entire strucure vibrates through the damping block 21 to follow the undulations in the record grooves. Vibrations of the armature 19 in this manner varies the opening of the air gap between the spaced-apart pole pieces 13 so that the magnetic flux supplied from permanent magnet 15 and through magnetic armature 19, threading pickup coils 14 is varied to thereby produce an electrical output signal which is transmitted through the terminals 23 and 24 to a loudspeaker system.

Figure 5:
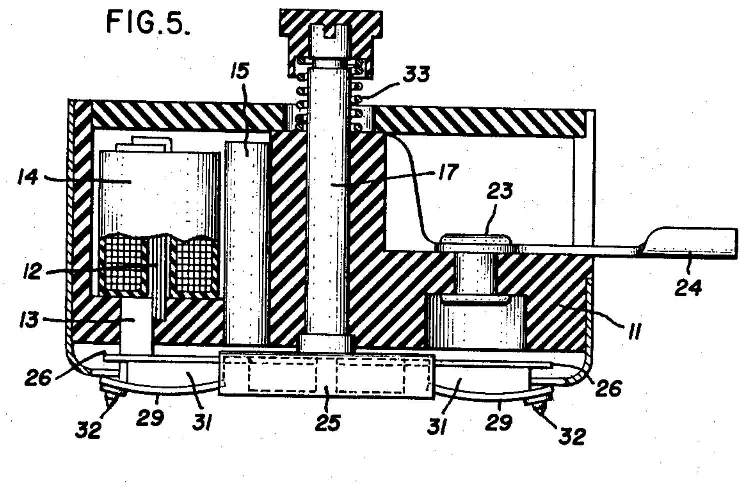
FIG. 5 is a sectional view of a second embodiment of a magnetic phonograph cartridge constructed in accordance with the invention.
Figure 6:
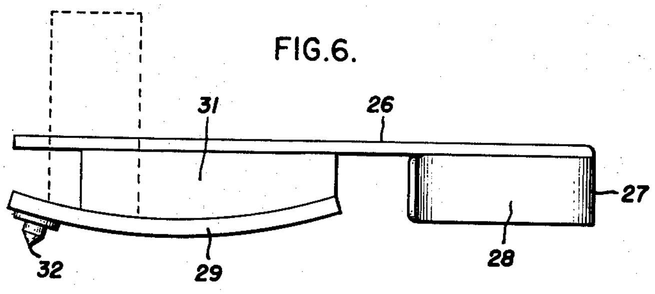
FIG. 6 is a side view of the replaceable stylus assembly used in the form of a magnetic cartridge shown in FIG. 5.
Figure 7:
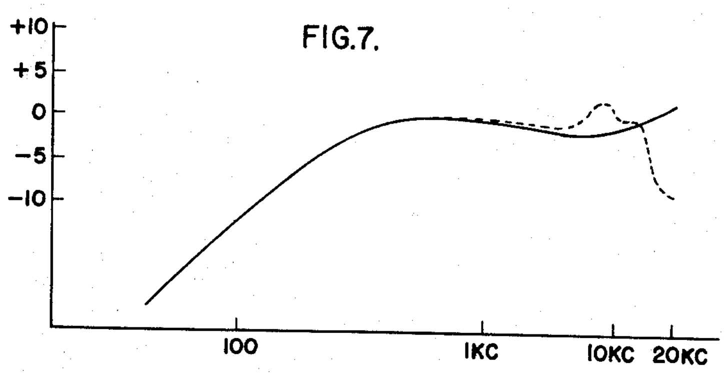
FIG. 7 is a graph illustrating the frequency response characteristic of the phonograph pickup cartridge shown in FIG. 1.

The construction of the replaceable stylus assembly 17 differs from previously known cartridges primarily in the manner in which the armature of magnetic material 19 is secured to the first arm of non-magnetic material 18, and through the arm 18 and post 17 to the body member 11 of the phonograph cartridge. By reason of this construction of the replaceable stylus assembly, it has been determined that greatly improved tracking ability is achieved at substantially reduced tracking pressures. For example, it has been determined that cartridges having tracking pressures as little as two grams can be constructed utilizing this technique for mounting the armature 19 to the bottom surface of the magnetic pickup cartridge. Further, it has been determined that cartridges constructed in this manner have substantially flat-response characteristics extending throughout the audio range as is evidenced by the graph shown in FIG. 7 of the drawings. While no ready explanation is available for this greatly improved performance it is believed to be obtained in part by the manner in which the magnetic armature 19 is secured to the remainder of the phonograph pickup cartridge, and the fact that this more resilient mounting substantially reduces resistance presented by the record engaging stylus to lateral movement of the stylus by the undulations in the record groove, and hence substantially reduces wear and tear on the record grooves themselves. Accordingly, it can be appreciated that the invention provides a new and improved magnetic phonograph pickup cartridge having an extremely low tracking pressure in the neighborhood of two grams or so, and that this greatly reduced tracking pressure is achieved by having a record engaging stylus secured in a magnetic armature which in turn is secured to the bottom of the phonograph pickup cartridge by a block of damping material. A second embodiment of magnetic phonograph pickup cartridge constructed in accordance with the invention is shown in FIGS. 5 and 6 and comprises a body member 11 supporting a pair of core members, one of which is shown at 12, having spaced-apart pole pieces 13. A pair of electrical pickup coils 14 surround each of the core members, and spaced from the core members 12 and pole pieces 13 is a permanent magnet 15. Coacting with these parts is a replaceable stylus assembly which comprises a post 17 retained in place by a cap and compression spring, and having open end channel member 25 secured to the end thereof T-fashion. The channel member 25 has the ends of its sides rolled over, and is adapted to receive a slide-in replacement stylus assembly in much the same manner as was the stylus assembly described in United States Patent No. 2,820,853, R. Dally, inventor, issued January 21, 1958, entitled "Phonograph Stylus Assembly," and assigned to the same assignee as the present invention. The slide-in replaceable stylus assembly used in the open ended channel member 25 is best shown in FIG. 6 of the drawings, and comprises a base member 26 of non-magnetic material such as brass which is preferably rectangular in shape. The base member 26 has an integral tab or separately attached downwardly depending member 27 on one end thereof to which are secured a pair of outwardly-flaring wings 28. The wings 28 have a certain amount of resiliency, and serve a purpose to be described more fully hereinafter. Spaced from the base member 26 is an armature 29 of magnetic material which is secured to the base member 26 by a block of damping material 31 that preferably comprises butyl rubber or some other suitable resilient material. The block of damping material 31 preferably extends over a major portion of the length of the magnetic armature member 29 but does not extend over its entire length so that a free end of the magnetic armature 29 extends outwardly cantilever-fashion. Secured to this free end of the magnetic armature 29 is a record engaging stylus 32 which is adapted to be disposed between the pole pieces 13 of the magnetic phonograph pickup cartridge, upon the replaceable stylus assembly being assembled together and placed in use with the cartridge. With the structure thus described, the base member 26 is slid into the open end of the channel member 25 in a manner such that the record engaging stylus 32 is disposed in the position illustrated in FIG. 5 of the drawings with relation to the pole pieces 13. With the base member 26 thus inserted, the outwardly-flaring resilient wings 28 serve to frictionally retain base member 26 and hence the replaceable slide-in stylus assembly in position within the channel member 25.

Upon being thus assembled the operation of the replaceable stylus assembly is much the same as that described with relation to the assembly shown in FIGS. 1 through 4. If desired, an otherwise identical slide-in base member and armature may be secured in the remaining open end of channel member 25, but which differs only in the size of the record engaging stylus 32. That is to say, record engaging stylus 32 may be of a size such that it may be used with micro-groove records, while the additional record engaging stylus may be of a larger size for use with the seventy-eight r.p.m. records. In all other respects, the two slide-in stylus assemblies are similar. To adapt the phonograph pickup cartridge for use with micro-groove records, or vice-versa, all that then need be done would be to depress the supporting post 17 against the restraining action of coil spring 33 so that the channel member 25 is lifted free of the spaced-apart pole pieces 13, and rotate the channel member 25 so as to bring into position a record engaging stylus 32 having the desired size in the manner described in the above-identified United States Patent Number 2,554,209 Miner et al.

In operation, the phonograph pickup cartridge contruction illustrated in FIG. 5 is much the same as that described with relation to the cartridge shown in FIG. 1, and hence need not be described again in detail. It should be pointed out however, that the FIG. 5 construction does embody the advantages obtained by reason of the manner in which the magnetic armature 29 is secured by the block of damping material 31 to the nonmagnetic base 26; and hence the construction shown in FIG. 5 does provide the desired lower tracking pressure characteristic.

From the foregoing description, it can be appreciated that the present invention provides a new and improved magnetic phonograph pickup construction in which a record engaging stylus is secured to an armature that in turn is supported on the bottom of a magnetic pickup cartridge by a block of damping material and which has an extremely low tracking pressure.

While the present invention has been described by reference to the particular embodiments disclosed, it can be appreciated that many modifications and alterations are possible by those skilled in the art in the light of the above teachings.

It is therefore to be understood that all such equivalent variations are intended to come within the true spirit and scope of the present invention, as defined by the appended claims.

What I claim as new and desire by Letters Patent of the United States is:

1. A phonograph stylus assembly comprising a base member, an elongated armature of magnetic material spaced from said base member and provided with a stylus extending laterally therefrom, and damping block means arranged to secure said armature to said base member, said damping block means being the sole means for securing said armature to said base member.

2. A phonograph stylus assembly comprising an elongated base member of nonmagnetic material, an elongated armature of magnetic material positioned substantially parallel to and spaced from said base member, a stylus attached to and extending laterally from said armature, and damping block means arranged to secure said armature to said base member, said damping block means being the sole means for securing said armature to said base member.

3. A phonograph stylus assembly comprising an elongated base member of nonmagnetic material, an elongated armature of magnetic material positioned substantially parallel to and spaced from said base member, a stylus attached to and extending laterally from said armature near an end thereof, and damping block means positioned between and attached to said base member and said armature, said damping block means being the sole means for securing said armature to said base member.

4. A phonograph stylus assembly comprising an elongated arm of nonmagnetic material, a mounting post attached to said arm near an end thereof and extending laterally therefrom, an elongated armature of magnetic material positioned substantially parallel to and spaced from said arm on the side thereof away from said post, a stylus attached to said armature near the end thereof that is relatively remote from said post, said stylus extending laterally from said armature in a direction opposite to the direction in which said post extends from said arm, and damping block means positioned between and attached to said arm and said armature, said damping block means being the sole means for securing said armature to said base member.

5. A phonograph stylus assembly for use with a phonograph pickup cartridge having a magnetic pole piece arrangement, said stylus assembly comprising a base member, an armature of magnetic material spaced from said base member and adapted to be cooperatively spaced from said pole piece arrangement when the stylus assembly is used with said pickup cartridge, a stylus attached to and extending from said armature, and damping block means arranged to secure said armature to said base member, said damping block means being the sole means for securing said armature to said base member.

6. A phonograph stylus assembly for use with a phonograph pickup cartridge having a magnetic pole piece arrangement, said stylus assembly comprising a base member, an elongated armature of magnetic material spaced from said base member and adapted to be cooperatively spaced from said pole piece arrangement when the stylus assembly is used with said pickup cartridge, a stylus attached to and extending laterally from said armature, and damping block means arranged to secure said armature to said base member, said damping block means being the sole means for securing said armature to said base member.

7. A phonograph stylus assembly comprising an elongated base member, an elongated armature positioned substantially parallel to and spaced from said base member, a stylus attached to and extending laterally from said armature, and damping block means positioned between and attached to said base member and said armature, said damping block means being the sole means for securing said armature to said base member.

8. A phonograph stylus assembly comprising an elongated base member, an elongated armature positioned substantially parallel to and spaced from said base member, a stylus attached to and extending laterally from said armature, and a block of damping material positioned between and attached to said base member and said armature, said block of damping material being the sole means for securing said armature to said base member.

9. A stylus assembly as claimed in claim 8, in which a portion of said armature is tilted in a direction toward said base member, said block of damping material being between and attached to said base member and said tilted portion of the armature.

10. A stylus assembly as claimed in claim 8, in which said armature has a curved shape with the concave side thereof facing toward said base member, said block of damping material being between and attached to said base member and said concave side of the armature.

References Cited in the file of this patent

UNITED STATES PATENTS

| | | |
|---|---|---|
| 1,435,095 | Adams | Nov. 7, 1922 |
| 1,444,147 | Zaayer | Feb. 6, 1923 |
| 2,494,438 | Gilbert | Jan. 10, 1950 |
| 2,639,156 | Ward | May 19, 1953 |
| 2,776,342 | Dally | Jan. 1, 1957 |
| 2,820,853 | Dally | Jan. 21, 1958 |
| 2,820,854 | Woodworth | Jan. 21, 1958 |
| 2,937,243 | Pritchard | May 17, 1960 |
| 2,950,447 | McShan | Aug. 23, 1960 |

FOREIGN PATENTS

| | | |
|---|---|---|
| 334,551 | Great Britain | Sept. 5, 1930 |